Patented Apr. 30, 1946

2,399,602

UNITED STATES PATENT OFFICE 2,399,602

CELLULOSE ETHER COMPOSITION

Lawrence A. Rauner and Melvin J. Hunter, Midland, Mich., assignors to The Dow Chemical Company, Midland, Mich., a corporation of Michigan No Drawing. Application December 7, 1942, Serial No. 468,130

4 Claims. (Cl. 106—178)

This invention relates to an ethyl cellulose composition, and more particularly to a composition including ethyl cellulose of high ethoxy content characterized by its flexibility, high dielectric strength, and resistance to moisture.

Recently there has become available commercially in a number of viscosity types a high ethoxy ethyl cellulose having an ethoxy content of from 50 to 53 per cent which differs from previously prepared high ethoxy ethyl cellulose by its low degree of degradation, and which is characterized by a number of advantageous properties which are apparently dependent thereon. In contrast with ethyl cellulose previously available, solutions of the new product in aromatic or alcoholic solvents exhibit a high tolerance for aliphatic hydrocarbons. Solutions from which films, foils, coatings, and the like may be deposited, and in which the hydrocarbon solvent is predominately aliphatic in nature, may thus be prepared by first dissolving the high ethoxy ethyl cellulose directly in an aliphatic hydrocarbon solvent or in a relatively small amount of an alcoholic-aromatic hydrocarbon solvent and then diluting to the desired degree with an aliphatic hydrocarbon. The new high ethoxy ethyl cellulose has a characteristically high dielectric constant and is very resistant to moisture absorption.

Attempts to plasticize the high ethoxy ethyl cellulose to render it sufficiently flexible for practical use have met with only indifferent success due, in part, to its low compatibility with many of the usual plasticizers for ethyl cellulose including many of those of the ester and alcohol types, such as phosphoric acid esters, phthalic acid esters, polyethylene glycols, etc. Other plasticizers, such as castor oil, the esters of ricinoleic acid and the chlorinated diphenyls, the soft non-oxidizing plasticizing alkyd resins, etc., although compatible to a somewhat greater degree with the high ethoxy ethyl cellulose, either lower the dielectric strength greatly or fail to provide compositions sufficiently flexible for many applications. In some instances, the heat stability of the composition containing such plasticizers is much inferior to that of the unplasticized high ethoxy ethyl cellulose and the composition may, depending upon the particular plasticizer used, become either softer or more brittle upon continued exposure to high temperatures. Consequently, the use of the high ethoxy ethyl cellulose for purposes where a high dielectric strength and a high degree of flexibility is required, has not heretofore been possible.

It is, accordingly, an object of the present invention to provide a flexible ethyl cellulose composition resistant to moisture and having a high dielectric strength.

An additional object is to provide a plasticizer for high ethoxy ethyl cellulose adapted to the preparation therefrom of a flexible plasticized composition of high dielectric strength.

These and related objects are readily accomplished by incorporating with an ethyl cellulose, having an ethoxy content of from 50 to 53 per cent, a branched-chain primary alkyl ester of a saturated fatty acid having from 12 to 24 carbon atoms in the molecule. The composition so formed may be dissolved in solvents, which may be predominately aliphatic in nature, to form solutions from which films, foils, or coatings of high dielectric strength and flexible over a wide range of temperature may be deposited. The composition retains, in large measure, its flexibility and high dielectric strength when cooled to from $-50°$ to $-70°$ C. Due to its low moisture absorption, the dielectric properties of the composition are not materially altered by prolonged immersion in water. Because of these properties, the composition is particularly adapted to the preparation of solvent-cast electrical insulators, such as foil, film and tape, and of insulating lacquers. Coatings of the composition, such as may be deposited from lacquers, are highly resistant to weathering and well adapted to use out-of-doors. The branched-chain primary alkyl esters have little or no tendency to volatilize or to crystallize from the composition.

Among the branched-chain primary alkyl esters which may be used as plasticizers in preparing the composition of the invention may be mentioned the isobutyl, isoamyl, 2-methyl-butyl, 2-methyl pentyl, 3-methyl-pentyl, 2,2-dimethyl-butyl, 2,3-dimethyl-butyl, pentamethyl-ethyl, 2-ethyl-hexyl and the 2-methyl-heptyl esters of lauric, myristic, palmitic and stearic acids. The esters may be prepared by esterifying the respective acids with an appropriate alcohol, usually with the aid of a catalyst such as hydrogen chloride, or they may be prepared by hydrogenation of a corresponding unsaturated ester.

It should be mentioned that the branched-chain primary alkyl esters of the invention are not compatible in all proportions with the high ethoxy ethyl cellulose. They are, however, all compatible therewith in amount sufficient to form compositions which are tough and flexible and which retain, in large measure, the dielectric properties of the high ethoxy ethyl cellulose. In some instances, the dielectric strength of the composition may even be higher than that of the unplasticized high ethoxy ethyl cellulose. It is understood that the branched-chain primary alkyl esters may be used in a compatible amount greater than about 5 per cent by weight of the composition, i. e. in amounts of from 5 per cent by weight of the composition up to the limit of their compatibility in the composition. The compatibility limits of a number of the plasticizers of the invention and, by way of comparison, of a number of plasticizers frequently used in plasticizing ethyl cellulose of from 44 to 49 per cent ethoxy content are given in Table I. In determining the compatibility limits of the esters, separate high ethoxy ethyl cellulose foils containing different amounts of each of the esters were cast on glass surfaces from a solution thereof in 95 parts by volume of toluene and 5 parts of ethanol. The foils were removed from the glass plates and portions of each were subjected to a series of tests including: (1) visual observation for clarity of film; (2) soaking for at least 200 hours in water at 21° C.; and (3) exposure out-of-doors for at least two weeks. The limit of compatibility was expressed as the lowest percentage of the ester in the composition which caused surface bloom or "sweating" thereon under any of the conditions of the test.

TABLE I

*Compatibility of plasticizers with high ethoxy ethyl cellulose*

| Plasticizer | Compatibility |
| --- | --- |
| 2-ethyl-hexyl stearate | 40. |
| 2-ethyl-butyl stearate | 35. |
| Toluene sulfonamide | Incompatible. |
| Blown castor oil | Do. |
| Hydrogenated vegetable oil | Spews. |
| Paraplex Rg-2 (alkyd plasticizing resin) | Incompatible. |
| Acryloid B-72 (acrylic ester polymer) | Do. |
| Paraplex RG-8 (modified alkyd plasticizing resin). | More than 30. |

The invention may be carried out in a number of ways. The high ethoxy ethyl cellulose and the branched-chain ester plasticizer may be dissolved in a mutual solvent to form a lacquer from which protective or insulating coatings may be deposited. Sheets or films may be cast from the solution and used as insulating wrappings or in the preparation of drawn articles. Mixtures of the branched-chain ester plasticizers may be used, if desired, and, when a composition of maximum dielectric strength and water resistance is not desired, other compatible plasticizers may be included in the composition. Pigments and dyes, such as titanium oxide, carbon black, zinc oxide, Oil Soluble red and Anthraquinone blue AB base, and resins, such as phenol-aldehyde condensation products, the alkyds and modified alkyds, urea-formaldehyde and natural resins, may be incorporated in the composition in any convenient manner to modify its color and hardness.

Certain advantages of the invention may be seen from the following examples which, however, are not to be construed as limiting.

EXAMPLE 1

The moisture absorption and the dielectric strength before and after 24 hours immersion in water of a number of typical compositions of the invention together, by way of comparison, with unplasticized high ethoxy ethyl cellulose, having an ethoxy content of about 52 per cent and with the latter plasticized with Paraplex RG-8 (a modified alkyd plasticizing resin compatible with the high ethoxy ethyl cellulose and typical of a number of plasticizers widely used in lower ethoxy ethyl cellulose compositions) are given in Table 2. For purposes of comparison, the same proportion of plasticizer was used in each of the plasticized compositions.

The moisture absorption was determined by using sections of solvent-cast foil approximately 2 x 2 x 0.005 inches which had been dried for 24 hours at 55 to 60° C. and then conditioned by exposure for 24 hours at 21° C. to air of 50 per cent relative humidity. Each section was weighed and then immersed for 200 hours in distilled water at 21° C. after which it was removed from the distilled water and its surfaces blotted dry with filter paper. The section was weighed as nearly two minutes after removal from the distilled water as possible to avoid vaporization of the absorbed water which takes place rapidly. The water absorbed was calculated as the per cent increase in weight of the section. The dielectric strength was determined on similar sections of conditioned foil by A. S. T. M. Standards Method D 149-40 T (1940 supplement) using ¼ inch electrodes as specified for thin, narrow solid materials (tapes) and modified by increasing the voltage at the rate of 2500 volts per second. The dielectric strength was expressed as volts per mil of thickness of the foil at the point of rupture.

TABLE II

*Dielectric strength and moisture absorption of plasticized high ethoxy ethyl cellulose*

| Plasticized composition | Percent water absorbed | Dielectric strength | |
| --- | --- | --- | --- |
| | | Before immersion in water | After 24 hrs. immersion in water |
| 87% high ethoxy ethyl cellulose 13% 2-ethyl-hexyl stearate | 1.82 | 4,600 | 3,700 |
| 87% high ethoxy ethyl cellulose 13% 2-ethyl-butyl stearate | 1.63 | 4,550 | 3,700 |
| High ethoxy ethyl cellulose (unplasticized) | 2.43 | 4,500 | 3,400 |
| 87% high ethoxy ethyl cellulose 13% Paraplex RG-8 | 4.65 | 2,200 | 850 |

EXAMPLE 2

95 parts by weight of ethyl cellulose having an ethoxy content of about 52 per cent and 5 parts of 2-ethyl-hexyl stearate were dissolved in a mixture of 380 parts of toluene and 20 parts of ethanol. Thin sheets cast from the solution were unaffected in physical properties after heating to 150° C. for 100 hours and remained flexible when cooled to −70° C. The dielectric strength was about 4500 volts per mil of thickness of the sheet.

EXAMPLE 3

70 parts by weight of ethyl cellulose having an ethoxy content of about 52 per cent, 15 parts of 2-ethyl-butyl stearate and 14 parts of Super-Beckacite 1001 (an unmodified phenol-aldehyde resin) were dissolved in a mixture of 360 parts of toluene and 40 parts of ethanol. Thin sheets cast from the solution, although harder than the sheets of Example 2, retained most of their flexibility and shock resistance at temperatures of from −60° to −70° C. and were equal in heat-stability to the sheets of Example 2.

We claim:

1. A composition characterized by high dielectric strength, low moisture absorption, and high flexibility at low temperatures, comprising essentially ethyl cellulose having an ethoxy content of from 50 to 53 per cent which is soluble in aliphatic hydrocarbon solvents and has a low degree of compatibility with esters of phosphoric and phthalic acids, and a compatible amount in excess of 5 per cent by weight of a plasticizer consisting of a branched-chain primary alkyl ester of a saturated fatty acid having from 12 to 24 carbon atoms in the molecule.

2. A composition as claimed in claim 1 wherein the plasticizer is a branched-chain primary alkyl ester of stearic acid.

3. A composition as claimed in claim 1 wherein the plasticizer is 2-ethyl-hexyl-stearate.

4. A composition as claimed in claim 1 wherein the plasticizer is 2-ethyl-butyl-stearate.

LAWRENCE A. RAUNER.
MELVIN J. HUNTER.